United States Patent
Yoo et al.

(10) Patent No.: US 11,249,733 B2
(45) Date of Patent: Feb. 15, 2022

(54) ELECTRONIC APPARATUS AND CONTROL METHOD THEREOF

(71) Applicant: SAMSUNG ELECTRONICS CO., LTD., Suwon-si (KR)

(72) Inventors: Sungbae Yoo, Suwon-si (KR); Seolheui Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/155,558

(22) Filed: Jan. 22, 2021

(65) Prior Publication Data

US 2021/0232368 A1    Jul. 29, 2021

(30) Foreign Application Priority Data

Jan. 23, 2020  (KR) .................. 10-2020-0009517

(51) Int. Cl.
  *G06F 8/33*   (2018.01)
  *G06F 8/41*   (2018.01)
  *G06F 9/445*  (2018.01)

(52) U.S. Cl.
  CPC ............. *G06F 8/33* (2013.01); *G06F 8/434* (2013.01); *G06F 9/44526* (2013.01)

(58) Field of Classification Search
  None
  See application file for complete search history.

(56) References Cited

U.S. PATENT DOCUMENTS

| | | | |
|---|---|---|---|
| 5,857,105 A | 1/1999 | Ayers et al. | |
| 6,202,202 B1* | 3/2001 | Steensgaard | G06F 8/437 |
| | | | 717/127 |
| 6,292,940 B1 | 9/2001 | Sato | |
| 7,873,952 B2 | 1/2011 | Shtilman et al. | |
| 7,971,255 B1* | 6/2011 | Kc | G06F 21/566 |
| | | | 726/24 |
| 8,566,944 B2* | 10/2013 | Peinado | G06F 21/566 |
| | | | 726/24 |
| 8,806,450 B1 | 8/2014 | Maharana et al. | |
| 10,055,592 B2 | 8/2018 | Baji-Gál | |
| 2004/0168078 A1* | 8/2004 | Bradley | G06F 9/3806 |
| | | | 713/190 |
| 2008/0104096 A1* | 5/2008 | Doval | G06F 8/10 |
| 2017/0103210 A1* | 4/2017 | Baji-Gál | G06F 21/52 |
| 2017/0315903 A1* | 11/2017 | David | G06F 8/73 |
| 2021/0240819 A1* | 8/2021 | Pyo | G06F 21/54 |
| 2021/0255841 A1* | 8/2021 | Yoo | G06F 8/434 |

OTHER PUBLICATIONS

Mircea Namolaru, "Devirtualization in GCC", GCC Developers' Summit 2006, 9 pages.

* cited by examiner

*Primary Examiner* — Philip Wang
(74) *Attorney, Agent, or Firm* — Staas & Halsey, LLP

(57) ABSTRACT

An electronic apparatus and a control method of the electronic apparatus is provided. The method includes acquiring source code written in a programing language, identifying a structure including a function pointer from the source code, identifying a plurality of initialized variables as a plurality first variables among variables of the function pointer included in the identified structure, and modifying the source code by changing an indirect call using an unmodifiable variable among the plurality of first variables to a direct call.

16 Claims, 9 Drawing Sheets

FIG. 6A

```
define <device.h> static int example_dev_init(struct device_node *node)
{
......
}
DEV_OF_DECLARE(example "arm,example",
                              example_dev_init);

......
int result;
result = DEV_INIT_FN(example)(dev_node);
DEV_INIT_DATA(name) = setStatus(result);
.....
```

<example_dev.c>

FIG. 6B

```
struct of_devid __of_table_example = {
    .compatible = "arm.example",
    .fn = example_dev_init;
    .data = NULL;
};
```
~621

```
int example_dev_init(struct device_node *node)
{
......
}

.....
int result;
int D.1001;
int D.1001;
int D.1001;
```

```
D.1001 = __of_table_example->fn;
result = D.1001(dev_node);
```
~622

```
D.1002 = &__of_table_example->data
D.1003 = setStatus(result);
*D1002 = D.1003;
......
```

<example_dev.ssa>

FIG. 6C

```
struct of_devid __of_table_example = {
    .compatible = "arm.example",
    .fn = example_dev_init;
    .data = NULL;
};

int example_dev_init(struct device_node *node)
{
......
}

......
int result;
int D.1001;
int D.1001;
int D.1001;
```
| example_dev_init(dev_node); | ~632 |

```
D.1002 = &__of_table_example->data
D.1003 = setStatus(result);
*D1002 = D.1003;
......
```

<example_dev_post.ssa>

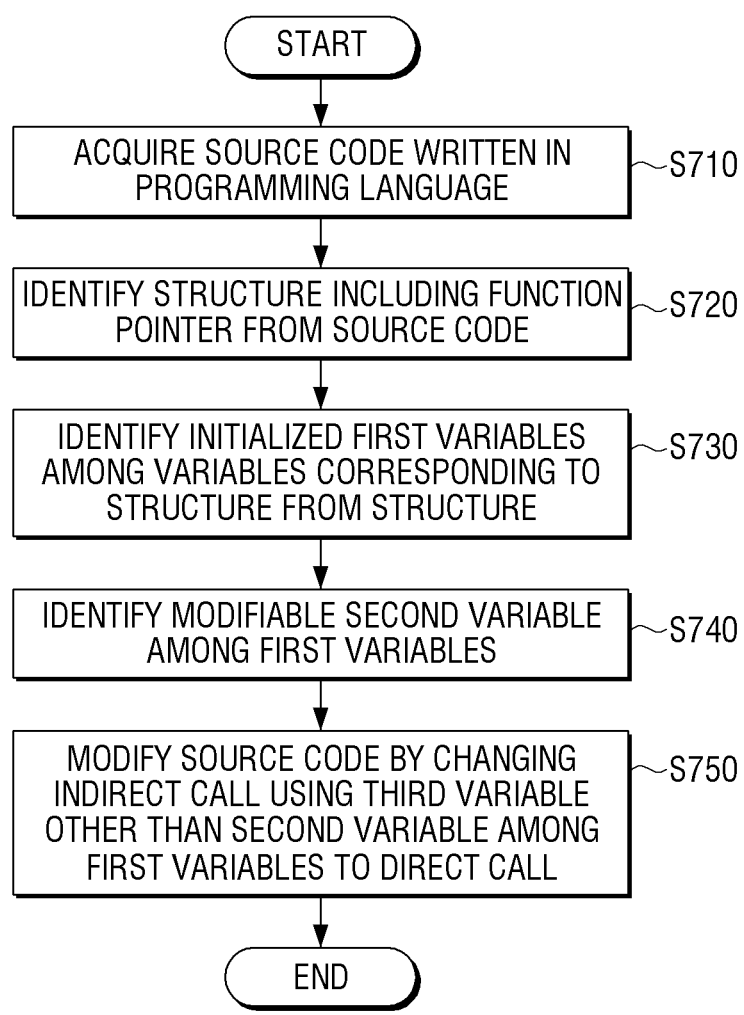

ELECTRONIC APPARATUS AND CONTROL METHOD THEREOF

CROSS-REFERENCE TO RELATED APPLICATIONS

This application is based on and claims priority under 35 U.S.C. § 119(a) of a Korean patent application number 10-2020-0009517, filed on Jan. 23, 2020 in the Korean Intellectual Property Office, the disclosure of which is incorporated by reference herein in its entirety.

BACKGROUND

1. Field

The disclosure relates to an electronic apparatus and a control method thereof. More particularly, the disclosure relates to an electronic apparatus for changing an indirect call of a structure including an unchanged variable included in source code into a direct call, and a control method thereof.

2. Description of the Related Art

The development of computer technology has changed the lives of modern people.

However, attempts to exploit this to gain unfair advantage have been increasing. For example, control flow attacks using indirect calls included in source code using memory corruption such as Use-After-Free are increasing. The Use-After-Free refers to free an allocated memory and then accesses the memory. When using the freed memory, corruption of stored data or arbitrary code may be executed.

Conventionally, a devirtualization technique for replacing an indirect call with respect to a virtual method without overriding the source code written in an object oriented programming language to a direct call in order to protect against the attack described above. However, the conventional devirtualization technique may be applied only to the source code using the object oriented programming language, and may be applied only when the annotation is included in the source code.

Accordingly, there is a need to protect source codes written in a language other than an object oriented programming language in various layers such as kernel, application, and remote procedure call (RPC), or the like.

SUMMARY

An aspect of the disclosure is to provide a control method of an electronic apparatus. The method includes acquiring source code written in a programing language, identifying a structure including a function pointer from the source code, identifying a plurality of initialized variables as a plurality first variables among variables of the function pointer included in the identified structure and modifying the source code by changing an indirect call using an unmodifiable variable among the plurality of first variables to a direct call.

Another aspect of the disclosure is to provide an electronic apparatus. The electronic apparatus includes a memory configured to store at least one instruction, and a processor, wherein the processor is configured to acquire source code written in a programming language by executing the instruction, identify a structure including a function pointer from the source code, identify a plurality of initialized variables as a plurality first variables among variables of the function pointer included in the identified structure, and modify the source code by changing an indirect call using an unmodifiable variable among the plurality of first variables to a direct call.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6A is a view illustrating source code in a form of c language according to an embodiment of the disclosure;

FIG. 6B is a view illustrating source code of FIG. 6A converted into an intermediate language form according to an embodiment of the disclosure;

FIG. 6C is a view illustrating an indirect call is converted into a direct call in a code of an intermediate language form according to an embodiment of the disclosure; and FIG. 7 is a flowchart for changing an indirect call included in source code into a direct call according to an embodiment of the disclosure.

DETAILED DESCRIPTION

The following description with reference to the accompanying drawings is provided to provide an electronic apparatus that changes an indirect call using an unchanged variable in a structure of source code to a direct call and a control method hereof.

The disclosure will be described in detail with reference to the accompanying drawings.

Figure 1:
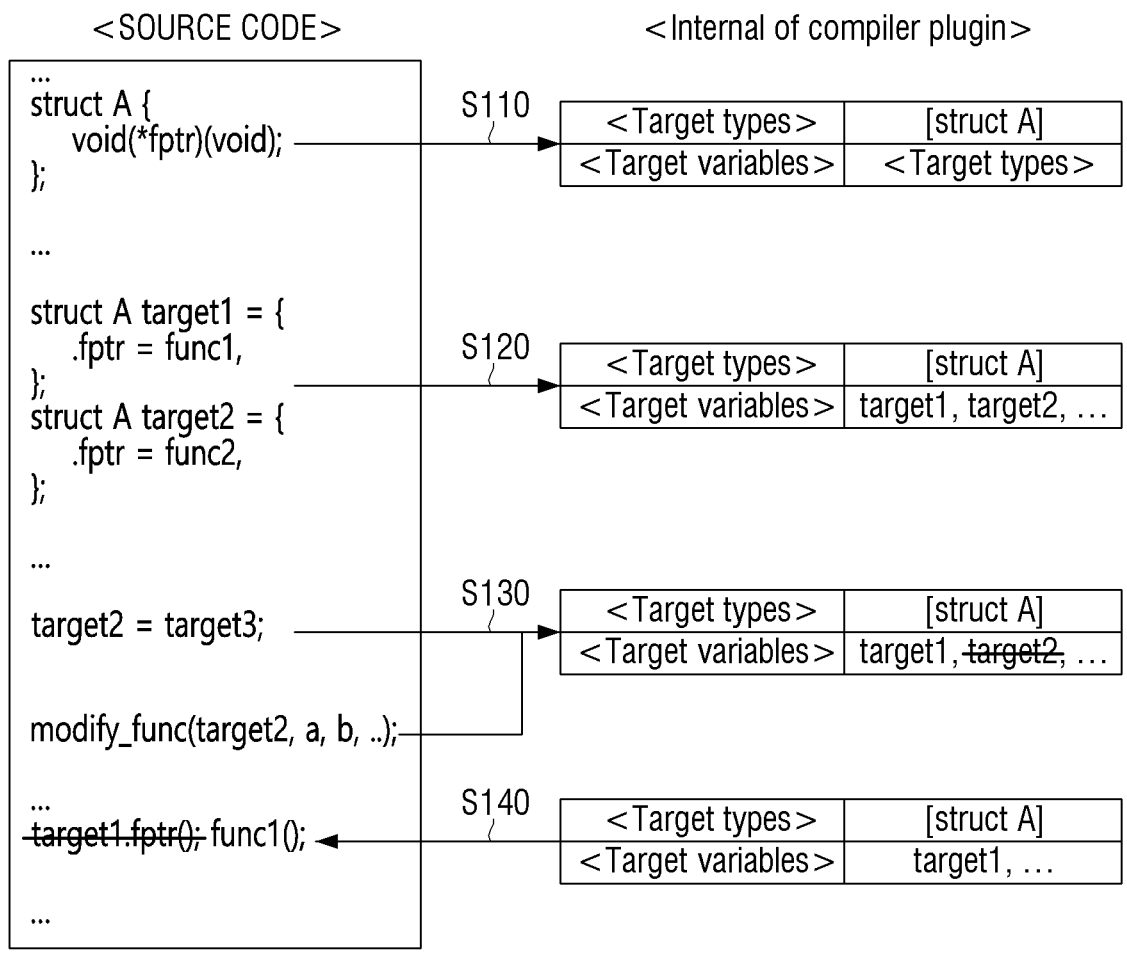
FIG. 1 is a view illustrating a method for changing an indirect call to a direct call according to an embodiment of the disclosure.

FIG. 1 is a view illustrating a method for changing an indirect call to a direct call according to an embodiment of the disclosure.

Referring to FIG. 1, source code is source code written in a programming language, and a part of the source code is briefly illustrated in FIG. 1. The electronic apparatus according to the disclosure may acquire source code written in a programming language, and identify a structure including a function pointer in the acquired source code (S110).

The source code according to the disclosure may not include annotation or may be source code not written in an object oriented programming language, and details thereof will be described below with reference to FIG. 2.

Referring to FIG. 1, the source code illustrates a struct A including a function pointer. The function pointer is a type of pointers supported by programming languages, and refers to an executable code, instead of referring to data values, in memory. When the function pointer is dereferenced, a function pointed by the function pointer may be operated as a normal function call. An indirect call is defined to make the function indicated by the function pointer operate like a normal function call.

When the electronic apparatus identifies a structure including a function pointer in the source code, the function pointer may identify a variable initialized with a specific function as a first variable among variables for the function pointer included in the corresponding structure in the identified structure (S120). In other words, referring to FIG. 1, the electronic apparatus may identify a target1 variable including a portion where the function pointer is initialized to func1 and a target 2 variable including a portion where the function pointer is initialized to func2 as the first variable from the struct A.

The electronic apparatus may identify a variable that may be modified among the first variables as a second variable (S130). The variable that may be modified may include at least one of variables that are reassigned to other variables or delivered as changeable parameters. Referring to FIG. 1, when the target2 variable is reassigned to a target3 variable, the target2 variable reassigned to the target3 variable may be identified as the second variable. In addition, when the target2 variable is transferred to the changeable parameter through the modify_func (target2, a, b, ..) included in the source code of FIG. 1, the target2 variable transferred to the changeable parameter may be identified as the second variable. In addition, the electronic apparatus may identify a variable other than the second variable among the first variables as a third variable, and modify the source code by changing an indirect call using the third variable to a direct call. (S140). In other words, referring to the source code of FIG. 1, the function pointer of the target1 variable is initialized to func1, and is not reassigned or transferred to the changeable parameter. Accordingly, the electronic apparatus may identify the target1 variable as the third variable, and change the indirect call using the target1 variable to the direct call.

According to an embodiment, the process described above may be implemented in a plugin of a compiler for compiling source code, and details will be described below with reference to FIGS. 6A and 6B.

Through the process described above, the indirect call included in a structure type including an unchanged variable in the source code, even for source code that does not include annotation or is not written in the object oriented programming language may be changed to the direct call to protect the indirect call of the source code.

According to various embodiments of the disclosure, the electronic apparatus may change the indirect call using the unchanged variable included in the source code written in the programming language to the direct call such that a control flow attack on the source code may be prevented.

Figure 2:
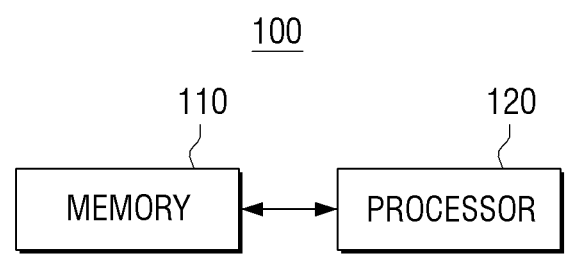
FIG. 2 is a block diagram illustrating a structure of an electronic apparatus, according to an embodiment of the disclosure.

FIG. 2 is a block diagram illustrating a structure of an electronic apparatus, according to an embodiment of the disclosure.

Referring to FIG. 2, the electronic apparatus 100 may include a memory 110 and a processor 120.

Various types of data such as programs, files, or the like such as applications may be installed and stored in the memory 110. The processor 120 may access and use data stored in the memory 110, or may store new data in the memory 110. The processor 120 may execute a program installed in the memory 110. In addition, the processor 120 may install an application received from the outside in the memory 110.

The memory 110, for example, may store an instruction or data regarding at least one of the other elements of the electronic apparatus 100. The memory 110 may be implemented as a non-volatile memory, a volatile memory, a flash memory, a hard disk drive (HDD), a solid state drive (SDD), or the like. The memory 110 may be accessed by the processor 120, and perform readout, recording, correction, deletion, update, and the like, on data by the processor 120. According to an embodiment of the disclosure, the term of the memory may include the memory 110, read-only memory (ROM) (not illustrated) and random access memory (RAM) (not illustrated) within the processor 140, and a memory card (not illustrated) attached to the electronic apparatus 100 (e.g., micro secure digital (SD) card or memory stick).

The processor 120 may be electrically connected to the memory 110 to control an overall operation and function of the electronic apparatus 100. The processor 120 may change an indirect call included in the source code into a direct call by executing at least one instruction stored in the memory 110.

According to an embodiment, the processor 120 may be implemented as a digital signal processor (DSP), a microprocessor, a time controller (TCON), but is not limited thereto, and the processor may include one or more among a central processing unit (CPU), micro controller unit (MCU), micro processing unit (MPU), controller, application processor (AP), or communication processor (CP), ARM processor, or may be defined as the corresponding term. In addition, the processor 120 may be implemented as a system on chip (SoC), a large scale integration (LSI) with an embedded processing algorithm, or field programmable gate array (FPGA).

For example, the processor 120 may acquire source code written in a programming language. In one embodiment of the disclosure, the electronic apparatus 100 may receive source code from an external device or server. Alternatively, the electronic apparatus 100 may acquire source code from a user.

In one embodiment of the disclosure, the processor 120 may acquire source code written in an object oriented programming language, such as a C++ language, or the like, or source code written in a language other than the object oriented programming language. The object oriented means that data is treated as an object, and the C++ language may be the example. In other words, according to the disclosure, the processor 120 may change not only source code written in the object oriented language but also the indirect call included in source code written in a language other than the object oriented language to a direct call.

The processor 120 may acquire source code that does not include annotation.

Annotation is a kind of meta-data that can be used in addition to the source code, and an annotation may be included in the source code to easily perform data validation. In other words, the techniques for changing an indirect call included in the existing source code to a direct call are limited to the source code written in the object oriented language, or applicable only to the source code including the annotation. However, according to the disclosure, the processor 120 may change an indirect call included in the source code written in a language other than the object oriented language and the source code not including an annotation into a direct call. However, it is not limited thereto, and the indirect call included in the source code written in the object oriented language or the source code including the annotation may also be changed to a direct call according to the disclosure.

The processor 120 may identify a structure including a function pointer in the obtained source code. Function pointers are a type of pointers supported by programming languages and refer to executable code in memory instead of referring to data values. When a function pointer is dereferenced, the function indicated by the function pointer may behave like a normal function call.

In other words, according to an embodiment of the disclosure, if it is written in the source code as below,

```
struct A target1 = {
.fptr = func1,
};
struct A target2 = {
.fptr = func2,
};
``` the function pointer of the target1 variable of the structure A is initialized to func1, the function pointer of the target2 variable is initialized to func2, and the processor 120 may identify the target1 variable and the target2 variable as the first variable.

The processor 120 may modify the source code by changing an indirect call using an unchanged variable among the first variables to a direct call. For example, the processor 120 may identify a second variable that can be modified among the first variables. A variable that can be modified means a variable that is reassigned to another variable or is transferred to a changeable parameter. For example, if target2=target3; is written in the source code, it means that the target2 variable, which is the first variable, is reassigned to the target3 variable, and the processor 120 may identify the target2 variable, which is reassigned to the target3 variable, as the second variable. Also, if modify_func (target2, a, b, ..) is written in the source code, it means that the target2 variable, which is the first variable, is transferred to a changeable parameter, and the processor 120 may identify the target2 variable transferred to the changeable parameter as the second variable.

The processor 120 may identify the variable excluding the second variable among the first variables as a third variable, and modify the source code by changing the indirect call using the third variable to a direct call. Specifically, the processor 120 may change the indirect call using the third variable except for the second variable that is reassigned or transferred to a changeable parameter among the first variables initialized in the structure of the source code, and modify the source code. As one embodiment, the third variable may be a const type that is not changeable.

In other words, an object of the disclosure is to change the indirect call using an unchanged variable into the direct call, and to prevent control flow attack using the indirect call included in the source code. The second variable may be modified later, so that only the indirect call using a variable other than the second variable among the first variables may be changed to a direct call.

The processor 120 may change the modified source code to a machine language. In other words, the process of changing the indirect call included in the source code according to the disclosure to the direct call is implemented in the form of a plug-in of the compiler or in the form of a plug-in of the linker in the phase of the compilation of the source code. In other words, the processor 120 may modify the source code in the form of a plug-in in the compiler for the compilation operation, or may modify the source code in the form of a plug-in in the linker for the compilation operation. However, it is not limited thereto, and the process described above may be implemented in the compiler or the linker itself.

Figure 3:
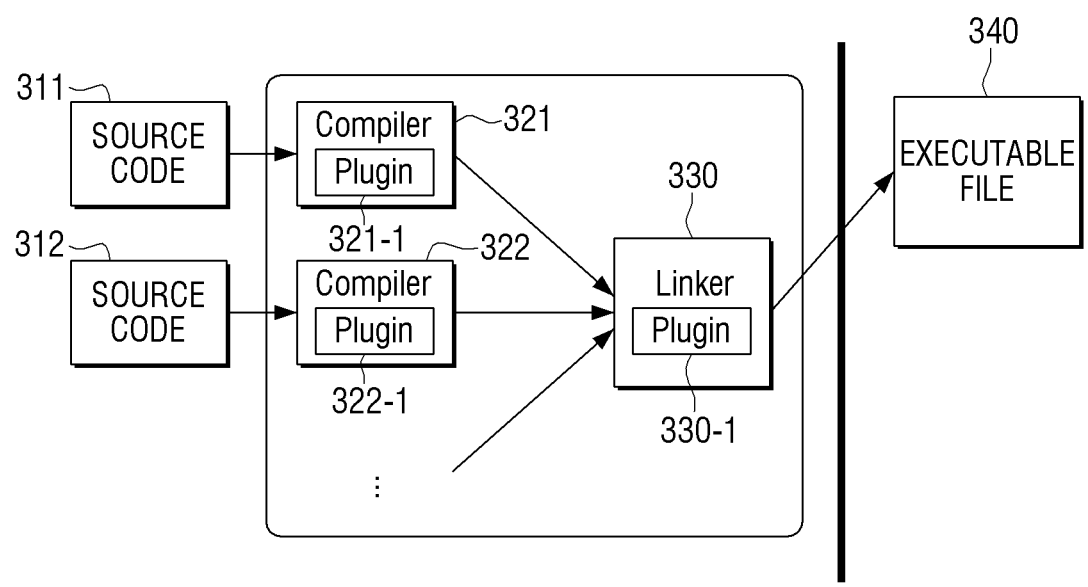
FIG. 3 is a view illustrating an implementation example according to an embodiment of the disclosure.

FIG. 3 is a view illustrating an implementation example according to an embodiment of the disclosure.

The process of changing the indirect call using the third variable included in the source code to the direct call may be implemented as compilers 321 and 322 in the process of compiling or as a linker (330) in itself, or may be implemented in the form of plug-ins 321-1 and 322-1 of compilers 321 and 322 or plug-in 330-1 of linker 330.

The compile operation is a process of changing the source code written in a programming language into a file composed of a machine language that can be understood by a computer, and a compile operation may be performed by the linker that combines a complier that changes the source code to an object file and a plurality of object files to change it to one executable file.

Specifically, the compiler may translate one or more source codes 311 and 312 into object files that can be understood by a computer. For example, as many object files as the number of source codes may be generated. Although two source codes 311 and 312 are illustrated in FIG. 3, the invention is not limited thereto, and three or more source codes may be compiled. The object file may include functions required by the executable file.

The linker may generate one executable file 340 by linking one or more object files. The object file may include functions required for execution of the executable file, and the linker may generate an executable file by linking the object files required for the executable file.

According to an embodiment of the disclosure, an indirect call using an unchanged variable included in the source codes 311 and 312 may be changed to a direct call in the phase of compile operation, this process may be implemented in the compilers 321 and 322 for processing the compile operation, or linker 330 in itself, or may be implemented in the form of the plug-ins 321-1, 322-1 of the compilers 321, 322 or plug-ins 330 of the linker 330-1.

Figure 4:
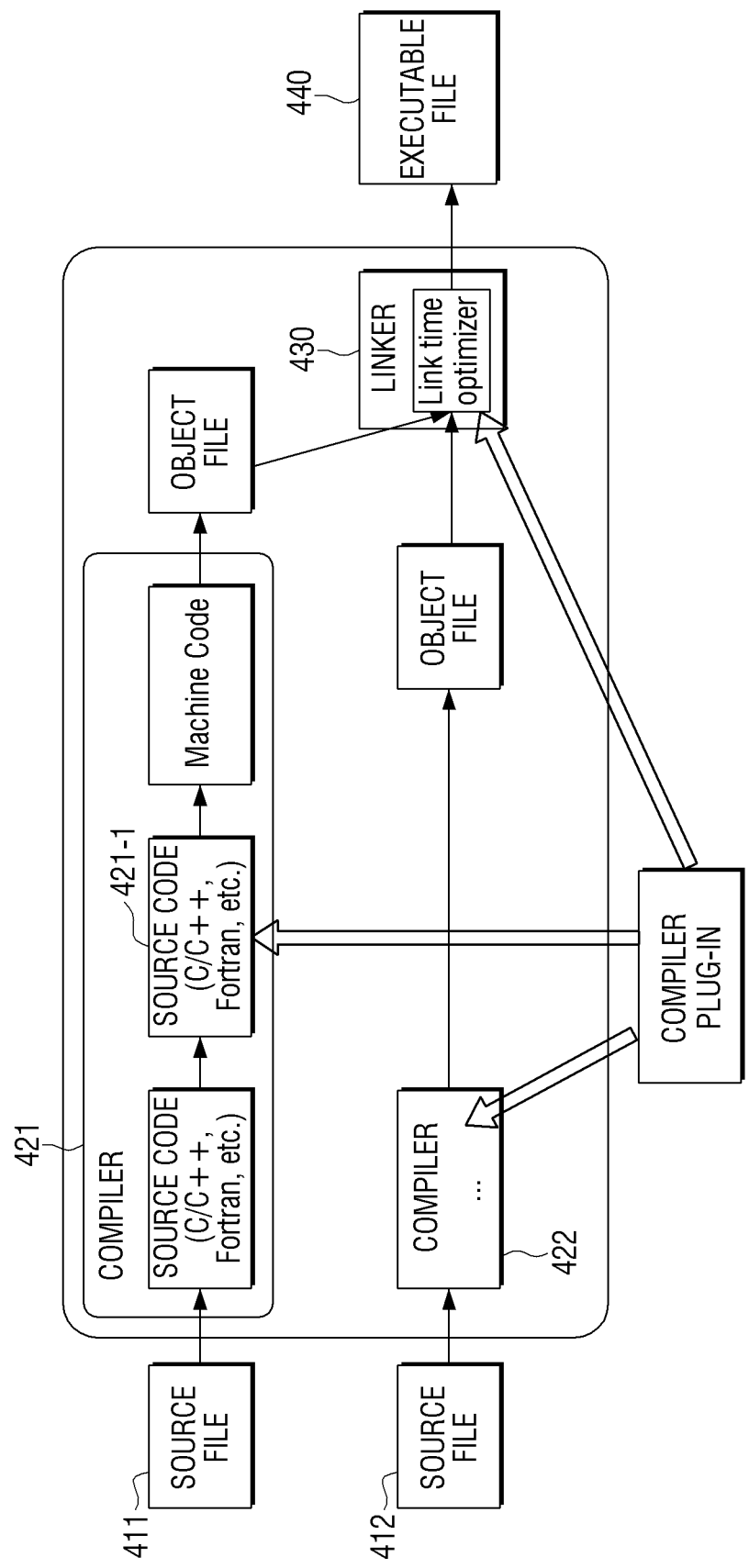
FIG. 4 is a view illustrating an implementation example according to an embodiment of the disclosure.

FIG. 4 is a view illustrating an implementation example according to an embodiment of the disclosure.

Specifically, FIG. 4 illustrates a process in which an indirect call using a third variable included in the source code is changed to a direct call is implemented as a form of compilers 421 and 422 in the compile operation or plug-in of the linker 430.

In other words, according to an embodiment of the disclosure, the compiler plug-in according to the disclosure is applied to the intermediate code 421-1 of the compiler 421, and the indirect call using the third variable included in the source code may be modified to the direct call.

According to an embodiment of the disclosure, the compiler plug-in according to the disclosure is applied to the link time optimizer of the linker 430, and the indirect call using the third variable included in the source code may be modified to the direct call.

FIG. 4 illustrates that the compiler plug-in is applied to both of the intermediate code 421-1 and the linker 430, but is not limited thereto, and is applied to one of the intermediate code 421-1 and the linker 430, and thus the indirect call using the third variable included in the source code according to the disclosure may be modified to the direct call.

Figure 5:
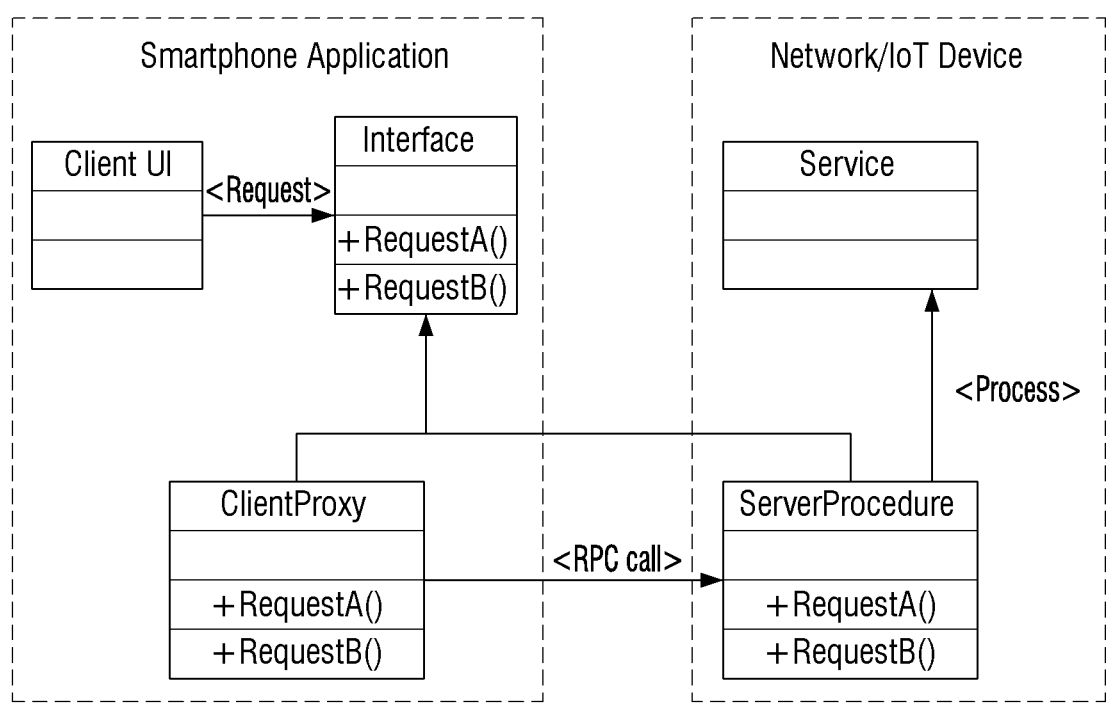
FIG. 5 is a view illustrating a design pattern according to an embodiment of the disclosure.

FIG. 5 is a view illustrating a design pattern according to an embodiment of the disclosure.

The indirect call is the basic part of a design pattern used when implementing a remote procedure call (RPC). The RPC means executing a remote function on a client. For example, the RPC is an interprocess communication technology that enables functions or procedures to be executed in different address spaces without coding for separate remote control.

The design pattern refers to a pattern in which design templates are frequently created for each type by standardizing frequently used design forms. Specifically, the design pattern is not used immediately by converting it into program code like an algorithm, but it provides a way to solve structural problems, and verifies the design knowledge acquired by many developers through their experience, and it is a generalized template that the verified knowledge is abstracted.

Referring to FIG. 5, in a smartphone application, a remote procedure call (RPC) may be used to execute a function in a network or IoT device in a remote location. In other words, when source code written in a programming language using the RPC is compiled into an executable program, the electronic apparatus according to the disclosure may modify the indirect call of the source code written in a programming language to the direct call.

In other words, there are many cases that a target function of the direct call in the RPC is not modified. The electronic apparatus according to the disclosure may modify the indirect call using a variable including a corresponding target function with respect to a case when the target function is not modified.

FIG. 6A is a view illustrating source code in a form of c language according to an embodiment of the disclosure, FIG. 6B is a view illustrating source code of FIG. 6A converted into an intermediate language form according to an embodiment of the disclosure, and FIG. 6C is a view illustrating an indirect call is converted into a direct call in a code of an intermediate language form according to an embodiment of the disclosure.

In other words, FIG. 6A illustrates a sample code in a c language form, and may be converted into an intermediate language form as illustrated in FIG. 6B in the compilation process according to the disclosure. And, the process of changing the indirect call according to the disclosure to the direct call may be implemented in an intermediate language form as illustrated in FIG. 6B.

For example, the electronic apparatus may identify a structure including a function pointer in the code of intermediate language form. In other words, referring to FIG. 6B, the electronic apparatus may identify that the corresponding structure includes the function pointer fn through the below

```
struct of_devid___of_table_example = {
.compatible = "arm.example",
.fn = example_dev_init;
.data = NULL;
};
``` of 621 in the intermediate language code.

The electronic apparatus may identify the first variable initialized among the variables of the function pointer in the identified structure. Referring to FIG. 6B, the electronic apparatus may identify that the variable for the function pointer fn is initialized through the below D.1001=_of_table_example->fn;

result=D.1001(dev_node); of 622 area of the intermediate language code. In other words, the electronic apparatus may identify that the variable for the function pointer fn is initialized in the 622 area of the code of intermediate language form, and thus identify that the indirect call function exists in the 622 area.

Also, the electronic apparatus may modify the source code by changing an indirect call using a variable other than a variable to be reassigned or a variable transferred to a modifiable parameter to a direct call. If the variable in the 622 area illustrated in FIG. 6B is not reassigned or transferred to the modifiable parameter, the electronic apparatus may modify an indirect call as below D.1001=_of_table_example->fn;

result=D.1001(dev_node);

of 622 of FIG. 6B to the direct call as example_dev_init(dev_node);.

FIG. 7 is a flowchart for changing an indirect call included in source code into a direct call according to an embodiment of the disclosure.

Referring to FIG. 7, the electronic apparatus 100 may acquire source code written in a programming language (S710). The programming language according to the disclosure may include both languages written in an object oriented programming language and languages not written in an object oriented programming language. In addition, as an embodiment, source code that does not include annotation may be acquired.

The electronic apparatus 100 may identify a structure including a function pointer in the source code (S720). Function pointers are a type of pointers supported by programming languages and refer to executable code in memory instead of referring to data values.

In the structure including the function pointer, the electronic apparatus 100 may identify the initialized first variable among variables with respect to the function pointer included in the structure (S730). Also, the electronic apparatus 100 may identify a variable that can be modified among the identified first variables as the second variable (S740). The modifiable variable may include at least one among variables transferred to the variable reassigned to the other variable or the variable transferred to the modifiable parameter.

Also, the electronic apparatus 100 may identify the remaining variables other than the identified second variable among the first variables as the third variable, and modify the indirect call using the third variable to a direct call to modify the source code (S750).

Terms used in the present disclosure are selected as general terminologies currently widely used in consideration of the configuration and functions of the present disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the present disclosure.

It should be understood that the embodiments of the disclosure include various modifications, equivalents, and/or alternatives. In relation to explanation of the drawings, similar drawing reference numerals may be used for similar constituent elements.

The terms "have", "may have", "include", and "may include" used in the embodiments of the disclosure indicate the presence of corresponding features (for example, elements such as numerical values, functions, operations, or parts), and do not preclude the presence of additional features.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B. The expression "1", "2", "first", or "second" as used herein may modify a variety of elements, irrespective of order and/or importance thereof, and only to distinguish one element from another. Accordingly, without limiting the corresponding elements.

When an element (e.g., a first element) is "operatively or communicatively coupled with/to" or "connected to" another element (e.g., a second element), an element may be directly coupled with another element or may be coupled through the other element (e.g., a third element). On the other hand, when an element (e.g., a first element) is "directly coupled with/to" or "directly connected to" another element (e.g., a second element), an element may not be existed between the other element.

In the description, the term "configured to" may be changed to, for example, "suitable for", "having the capacity to", "designed to", "adapted to", "made to", or "capable of" under certain circumstances. The term "configured to (set to)" does not necessarily mean "specifically designed to" in a hardware level. Under certain circumstances, the term "device configured to" may refer to "device capable of" doing something together with another device or components. For example, "a sub-processor configured (or configured to) perform A, B, and C" may refer to a generic-purpose processor (e.g., central processing unit (CPU) or an application processor) capable of performing corresponding operations by executing a dedicated processor (e.g., an embedded processor) or one or more software programs stored in a memory device to perform the operations.

The term "module" as used herein includes units made up of hardware, software, or firmware, and may be used interchangeably with terms such as logic, logic blocks, components, or circuits. A "module" may be an integrally constructed component or a minimum unit or part thereof that performs one or more functions. For example, the module may be composed of application-specific integrated circuit (ASIC).

According to an embodiment, the various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions. When the instructions are executed by a processor, the processor may directory perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media.

In addition, according to an embodiment, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media such as a manufacturer's server, the application store's server, or a memory in a relay server.

Further, each of the components (e.g., modules or programs) according to the various embodiments described above may be composed of a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program, or other component, according to various embodiments, may be sequential, parallel, or both, executed iteratively or heuristically, or at least some operations may be performed in a different order, omitted, or other operations may be added.

What is claimed is:

1. A control method of an electronic apparatus, the method comprising:
    acquiring a source code written in a programing language;
    identifying a structure including a function pointer from the acquired source code;
    identifying a plurality of initialized variables including a portion where the function pointer is initialized among variables of the function pointer included in the identified structure; and
    modifying the source code by changing an indirect call which uses an unmodifiable variable among the identified plurality of variables to a direct call.

2. The control method of claim 1, wherein the plurality of initialized variables are a plurality of first variables, and the modifying further comprises identifying a modifiable second variable among the plurality of first variables, and
    where the modifying of the source code by the changing of the indirect call which uses a third variable other than the modifiable second variable among the plurality of first variables to the direct call,
    wherein the modifiable second variable is configured to comprise at least one of a variable to be reassigned or a variable transferred to a modifiable parameter.

3. The control method of claim 2, wherein the third variable is a const type which is not modified.

4. The control method of claim 1, wherein the control method is configured to further comprise changing the modified source code to a machine language.

5. The control method of claim 1, wherein the source code does not include annotation.

6. The control method of claim 1, wherein the source code is written in a language other than an object oriented programming language.

7. The control method of claim 1, wherein the control method is configured to be implemented in a form of a plug-in in a compiler for a compilation operation.

8. The control method of claim 1, wherein the control method is configured to be implemented in a form of a plug-in in a linker for compilation.

9. An electronic apparatus comprising:
    a memory configured to store at least one instruction; and
    a processor configured to acquire source code written in a programming language by executing the instruction,
        identify a structure including a function pointer from the acquired source code, identify a plurality of initialized variables including a portion where the function pointer is initialized among variables of the function pointer included in the identified structure, and modify the source code by changing an indirect call which uses an unmodifiable variable among the identified plurality of variables to a direct call.

10. The electronic apparatus of claim 9, wherein the plurality of initialized variables are a plurality of first variables, and the processor is configured to identify a modifiable second variable among the plurality of first variables, and where the modify of the source code by the changing of the indirect call which uses a third variable other than the modifiable second variable among the plurality of first variables to the direct call, wherein the modifiable second variable is configured to comprise at least one of a variable to be reassigned or a variable transferred to a modifiable parameter.

11. The electronic apparatus of claim 10, wherein the third variable is a const type which is not modified.

12. The electronic apparatus of claim 9, wherein the processor is configured to change the modified source code to a machine language.

13. The electronic apparatus of claim 9, wherein the source code does not include annotation.

14. The electronic apparatus of claim 9, wherein the source code is written in a language other than an object oriented programming language.

15. The electronic apparatus of claim 9, wherein the processor is configured to modify the source code in a form of a plug-in in a compiler for compilation.

16. The electronic apparatus of claim 9, wherein the processor is configured to modify the source code in a form of the plug-in in a linker for compilation.

* * * * *